(12) United States Patent
Stevens et al.

(10) Patent No.: US 9,466,223 B2
(45) Date of Patent: Oct. 11, 2016

(54) MOBILE PLATFORM (75) Inventors: Robert Stevens, Tacolneston Norwich (GB); Kia Cammaerts, Kingsway Woking (GB)

(73) Assignee: ANSIBLE MOTION LTD, London (GB)

( * ) Notice: Subject to any disclaimer, the term of this patent is extended or adjusted under 35 U.S.C. 154(b) by 345 days.

(21) Appl. No.: 13/500,705

(22) PCT Filed: Sep. 29, 2010

(86) PCT No.: PCT/EP2010/064446
§ 371 (c)(1),
(2), (4) Date: Jul. 24, 2012

(87) PCT Pub. No.: WO2011/042338
PCT Pub. Date: Apr. 14, 2011

(65) Prior Publication Data
US 2012/0282588 A1    Nov. 8, 2012

(30) Foreign Application Priority Data
Oct. 9, 2009  (GB) ................................... 0917702.3

(51) Int. Cl.
*G09B 9/04*    (2006.01)
*G09B 9/02*    (2006.01)
*G09B 9/06*    (2006.01)
*G09B 9/14*    (2006.01)

(52) U.S. Cl.
CPC . *G09B 9/04* (2013.01); *G09B 9/02* (2013.01); *G09B 9/06* (2013.01); *G09B 9/14* (2013.01)

(58) Field of Classification Search
CPC .......... G09B 9/02; G09B 9/04; G09B 9/042; G09B 9/05; G09B 9/14
USPC ............................... 434/69, 29, 365; 482/51
See application file for complete search history.

(56) References Cited

U.S. PATENT DOCUMENTS

| | | | | |
|---|---|---|---|---|
| 1,789,680 A | * | 1/1931 | Gwinnett | 472/60 |
| 3,304,628 A | * | 2/1967 | Kaplan | 434/58 |
| 5,752,834 A | * | 5/1998 | Ling | 434/58 |
| 6,354,838 B1 | * | 3/2002 | Tagge et al. | 434/62 |
| 2005/0042578 A1 | * | 2/2005 | Ammon et al. | 434/62 |
| 2007/0287139 A1 | * | 12/2007 | Holm | 434/247 |

FOREIGN PATENT DOCUMENTS

| | | | |
|---|---|---|---|
| GB | 2 237 687 A | 2/2003 | |
| GB | 2378687 A * | 2/2003 | ............... G09B 9/04 |
| WO | WO 93/01577 A1 | 1/1993 | |

* cited by examiner

*Primary Examiner* — Robert J Utama
*Assistant Examiner* — Jennifer L Korb
(74) *Attorney, Agent, or Firm* — Nixon & Vanderhye P.C.

(57) ABSTRACT

A motion platform for use in a simulator comprising linear slides providing surge and sway, and a rotary table providing yaw. A payload carrying platform is mounted on the rotary table via three bell cranks to provide heave, pitch and roll.

10 Claims, 10 Drawing Sheets

MOBILE PLATFORM

BACKGROUND

This invention relates to mobile platforms more especially but not exclusively the invention relates to mobile platforms for use in motion simulators such as automobile simulators.

Automobile simulators are useful for both pleasure purposes and for training and development work for motorsports teams as well as for general automotive development, driver training and electronic control unit software development and engineer training.

A conventional simulator typically comprises a parallel robot such a Stewart or Gough platform which comprises six linear actuators provided at each end with universal joints connected to a ground support and a platform. Appropriate actuation of the cylinders allows motion in all degrees of freedom and combinations thereof. Often these degrees of freedom are named using nautical terminology, for example:
1. Moving up and down (heaving);
2. Moving left and right (swaying));
3. Moving forward and backward (surging);
4. Tilting forward and backward (pitching);
5. Turning left and right (yawing); and
6. Tilting side to side (rolling).

A problem with a Stewart platform is that it is very bulky and may require a special building to accommodate it.

Some, especially automobile simulators, have fewer than six degrees of freedom with typically sway being omitted.

It is often neither necessary nor desirable for the simulator to reproduce exactly the motions which are simulated. The simulator may provide initial cues to the user replicating the initial motion and then reducing the inputs so that the movement limits of the platform are not exceeded. Nevertheless a simulator can be very large and yet still have movement limits exceeded. The invention seeks to provide a motion platform with both good movement limits but also relatively small bulk.

BRIEF SUMMARY OF THE INVENTION

According to the invention there is provided a motion platform comprising
1) a first linear slideway carrying a first carriage;
2) means for displacing the first carriage along the first slideway along a first axis;
3) a rotary table carried on the first carriage for rotation about a second axis perpendicular to the first axis;
4) means for rotating the rotary table;
5) three bell cranks each having first and second arms, the bell cranks being pivotally mounted on the rotary table such that actuation of the bell crank causes the second arm to move with a component perpendicular to the first and second axes,
6) means for independently actuating the first arm of the bell cranks;
7) a platform; and
8) legs connecting the second arms of the bell cranks to the platform.

According to the invention there is provided a motion platform as claimed in claim 1 comprising
1) a first linear slideway carrying a first carriage;
2) means for displacing the first carriage along the first slideway along a first axis;
3) a rotary table carried on the first carriage for rotation about a second axis perpendicular to the first axis;
4) means for rotating the rotary table;
5) first and second bell cranks each having first and second arms, the bell cranks being coaxially pivotally mounted on the rotary table, the axis of the coaxial pivotal mount of the first and second bell cranks being in a plane parallel to the plane of the first linear slideway;
6) means for independently actuating the first and second bell cranks;
7) third bell crank having first and second arms, the third bell crank pivotally mounted on the rotary table, the axis of the pivotal mount being parallel to and spaced apart from the axis of the first and second bell cranks;
8) means for actuating the third bell crank;
9) a platform; and
10) legs connecting the bell cranks to the platform.

BRIEF DESCRIPTION OF THE DRAWINGS

Other features are set forth in the claims.

Embodiments of the invention will be described by way of non-limiting example by reference to the accompanying figures of which

DETAILED DESCRIPTION OF THE INVENTION

Figure 1:
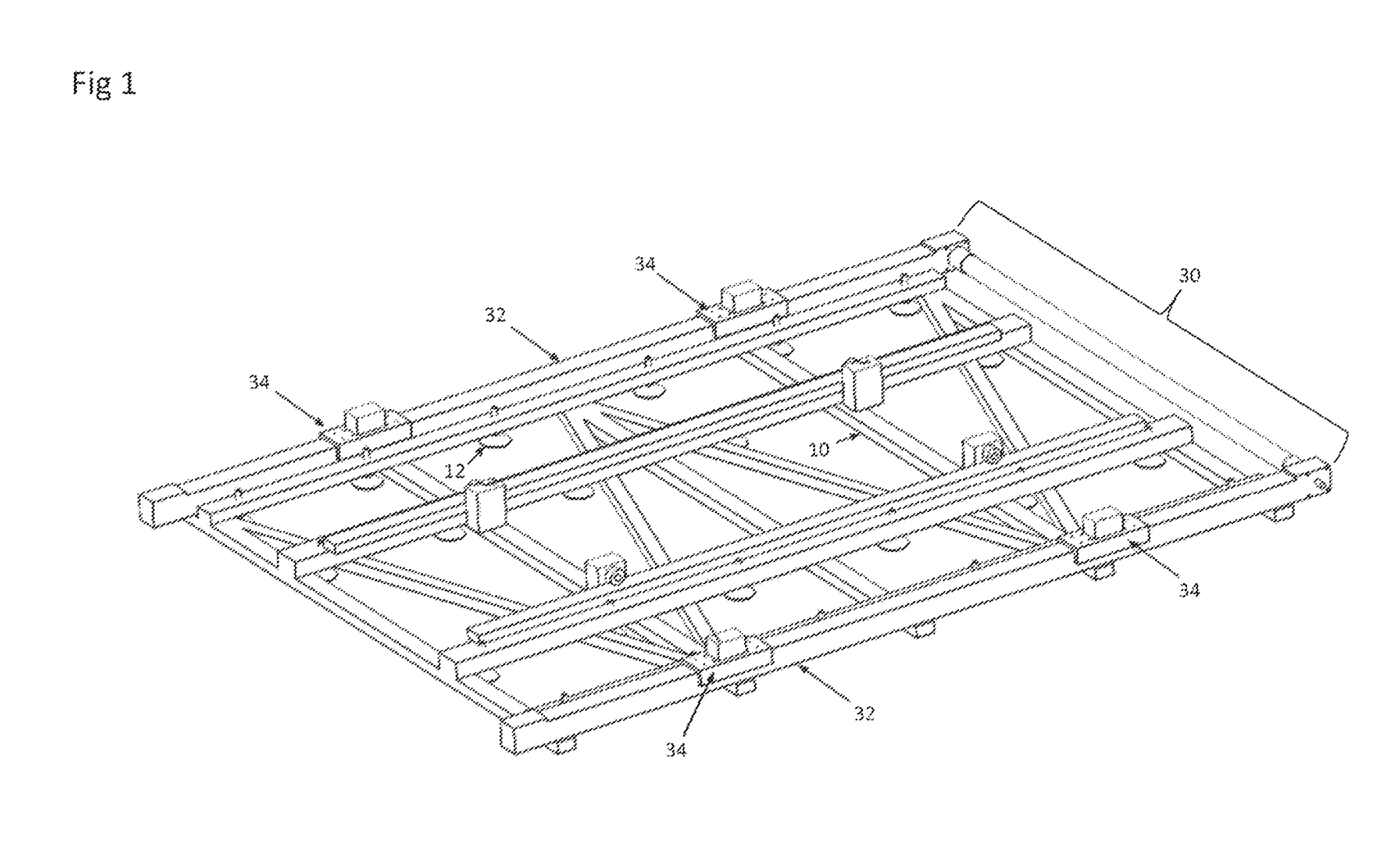
FIG. 1 is a scrap view of a base and second serial robot of the motion platform of the invention.
Figure 2:
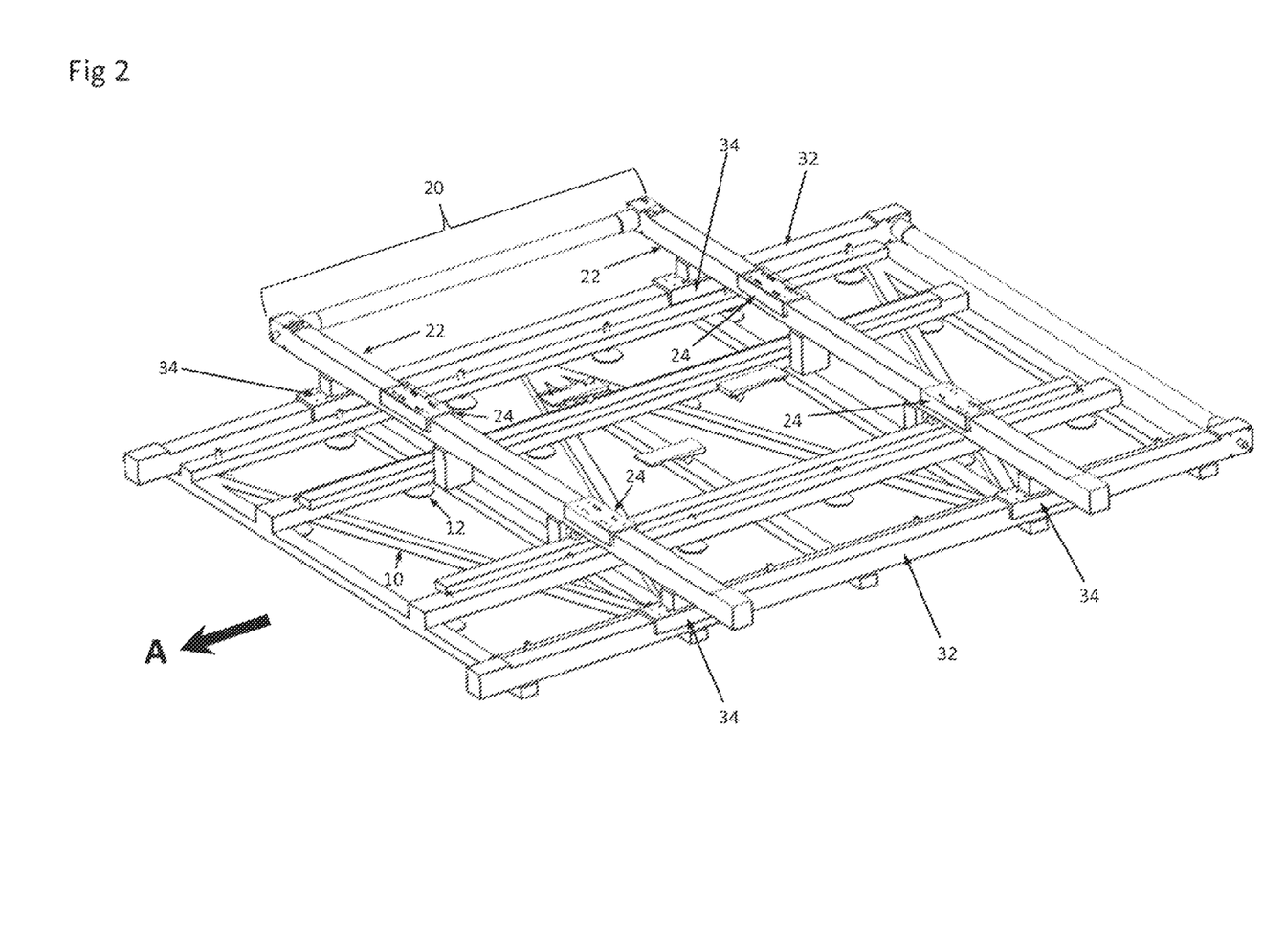
FIG. 2 is a scrap view of a base and first and second serial robots of the motion platform of the invention.

Apparatus 1 (FIG. 7) comprises a floor standing frame 10 (FIGS. 1 and 2) which may for example be a space frame. The construction of the frame 10 is not especially limiting. For example it could be made of metal such as aluminium and/or steel tubing and section. In some embodiments of the invention frame 10 is provided with adjustable feet 12 (FIGS. 1 and 2). Where provided, ground engaging feet allow the apparatus to be levelled without external shims.

Figure 7:
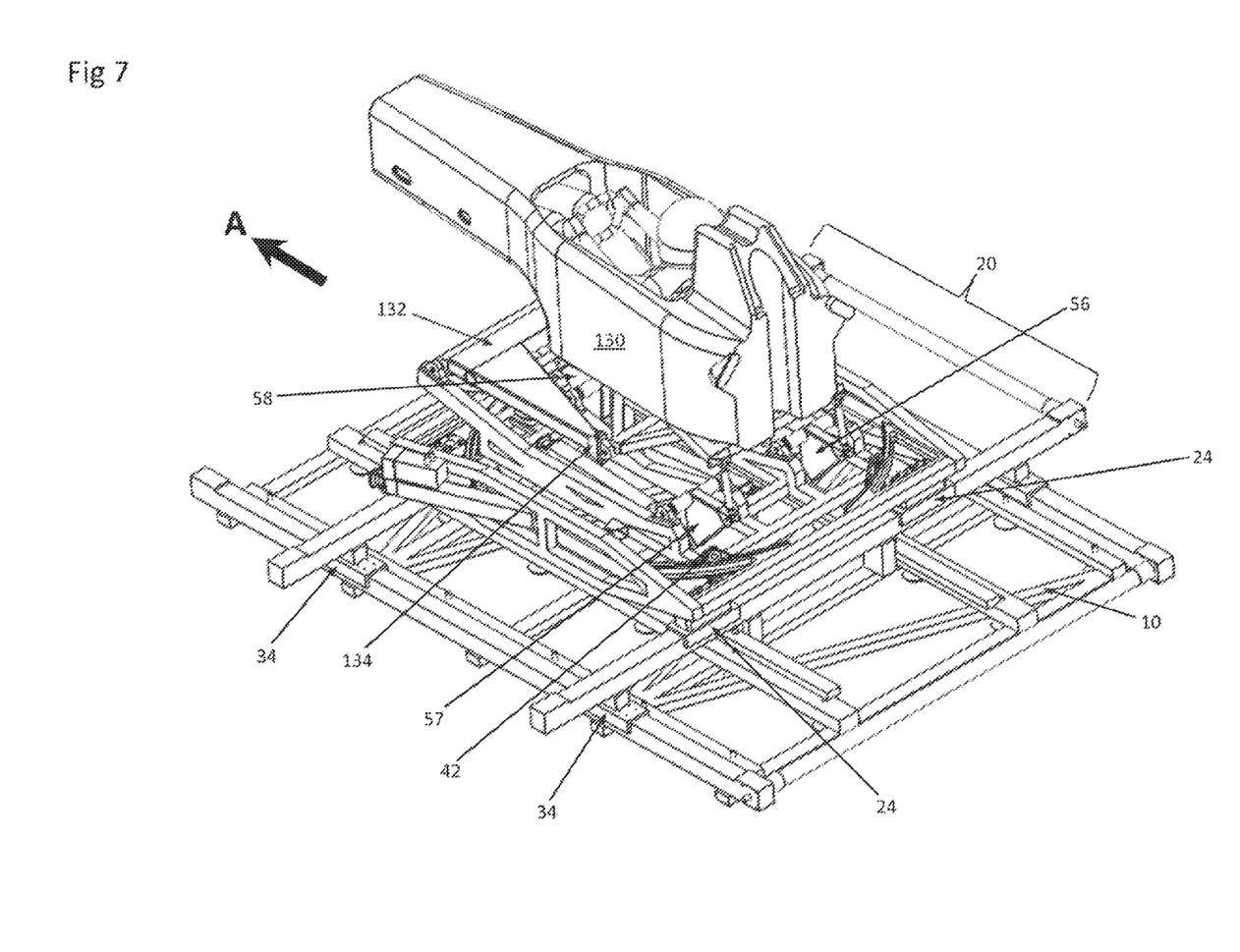
FIG. 7 is a perspective view of a motion simulator of the invention.

Frame 10 is provided with a first serial robot 20 (FIGS. 2 and 7). First serial robot 20 in the illustrated embodiment comprises a pair of spaced apart lateral first slideway members 22 such as beams carrying first carriages 24. First carriages 24 are therefore displaceable laterally along the first slideway relative to notional axis A. Displacing an article carried on first carriages 24 will therefore impart sway to the article. A linear actuator for impelling the carriages is provided. Those skilled in the art will have no difficulty in devising suitable linear actuators. Non-limiting examples include electromechanical actuators such as an electric motor bearing a lead screw received in a feed nut, hydraulic actuators and linear motors. In the illustrated embodiment, two first slideway members are provided but it will be apparent that different numbers may be employed.

Figure 8:
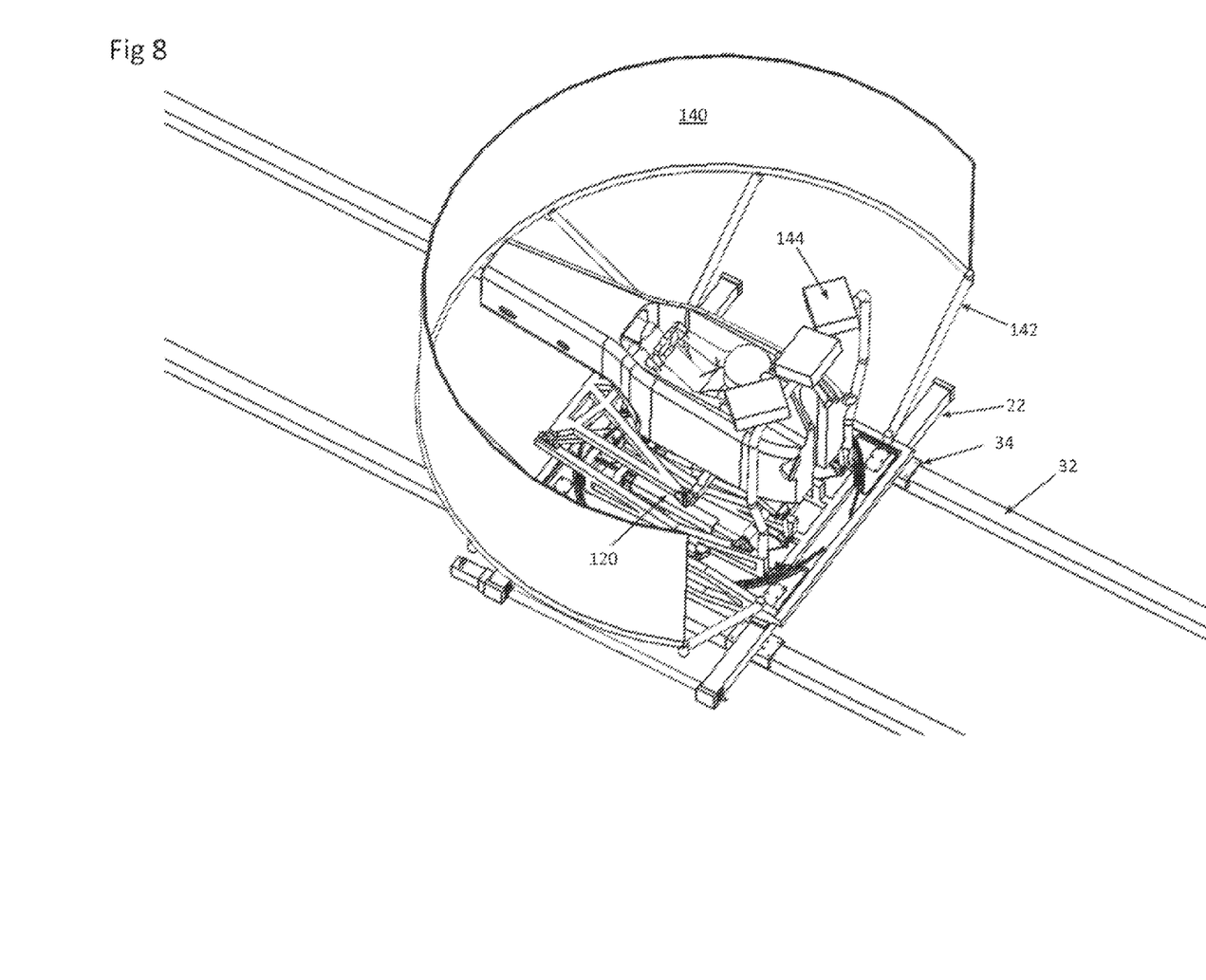
FIG. 8 is a perspective view of a further simulator of the invention.

In some embodiments of the invention frame 10 is provided with a second serial robot 30 (FIG. 1) substantially perpendicular to the first serial robot 20. Second serial robot 30 is arranged to provide surge and thus is arranged to provide motion substantially parallel to notional axis A. Second serial robot 30 is optional and is not provided in all embodiments of the invention. Second serial robot 30 can be omitted on the grounds of cost or space. In the context of motorsport, a school of thought holds that surge provides such a poor representation of braking and acceleration properties of a high performance vehicle that there is little point in providing small motion ranges. In some embodiments of the invention the second serial robot is present but not activated under some conditions. Second serial robot 30 comprises second slideway members 32 (FIGS. 1 and 8) carrying second carriages 34. Just as in the first serial robot, two slideway members and two carriages are provided in the illustrated embodiment. As in the first serial robot, the carriages of the second serial robot are impelled with a linear actuator.

A road vehicle accelerating or braking undergoes substantial g forces for extended periods in the same direction. For example a road car braking hard from motorway speeds may be subject to forces of the order of 1 g for several seconds. The forces in a motorsport vehicle may be of greater duration or intensity. Thus in order to replicate or provide a cue stimulus of such a large change, the second serial robot where provided may have very long slideways. In the illustrated embodiment the first serial robot 20 is mounted on the second carriages 34.

Figure 3:
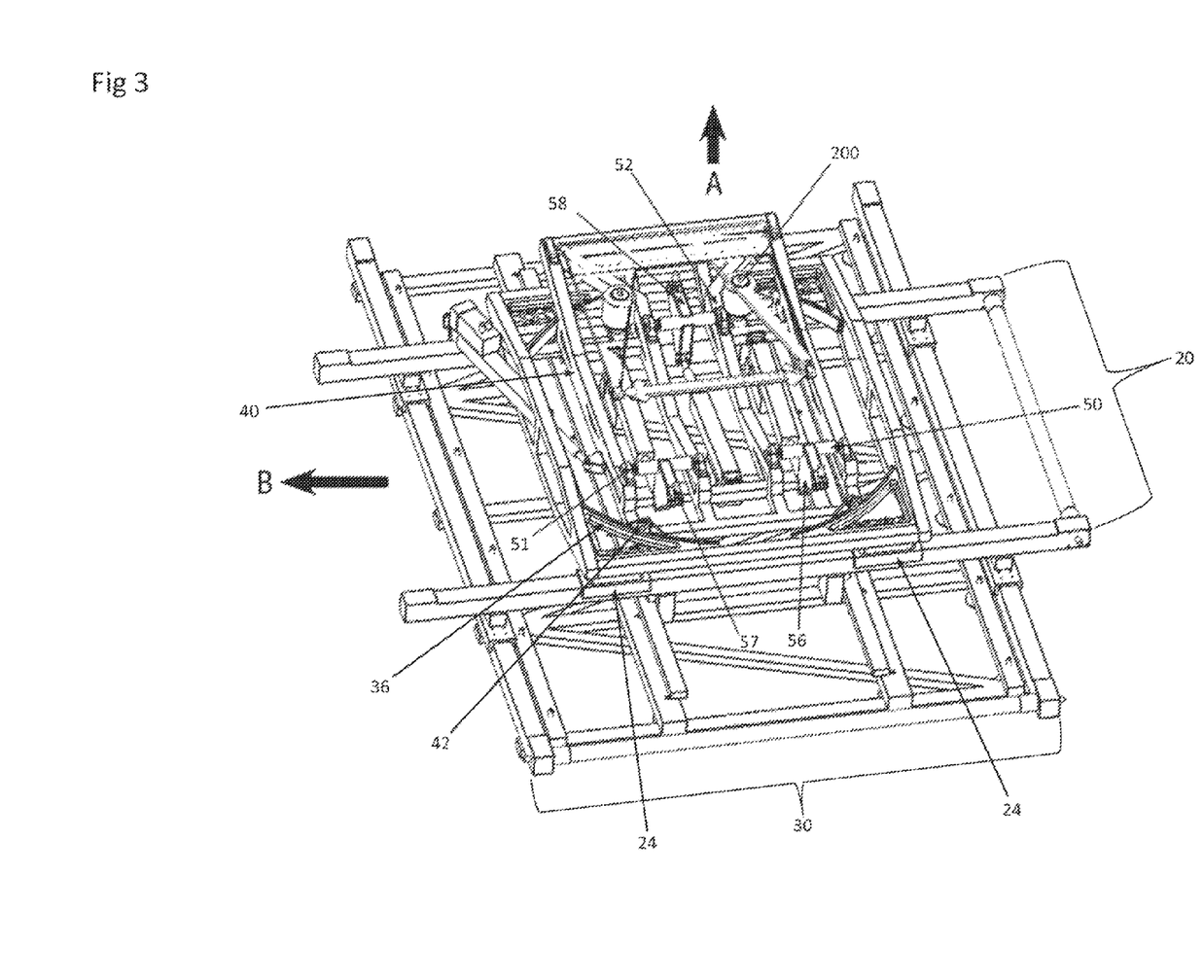
FIG. 3 is a longitudinal section of a motion platform of the invention.
Figure 3A:
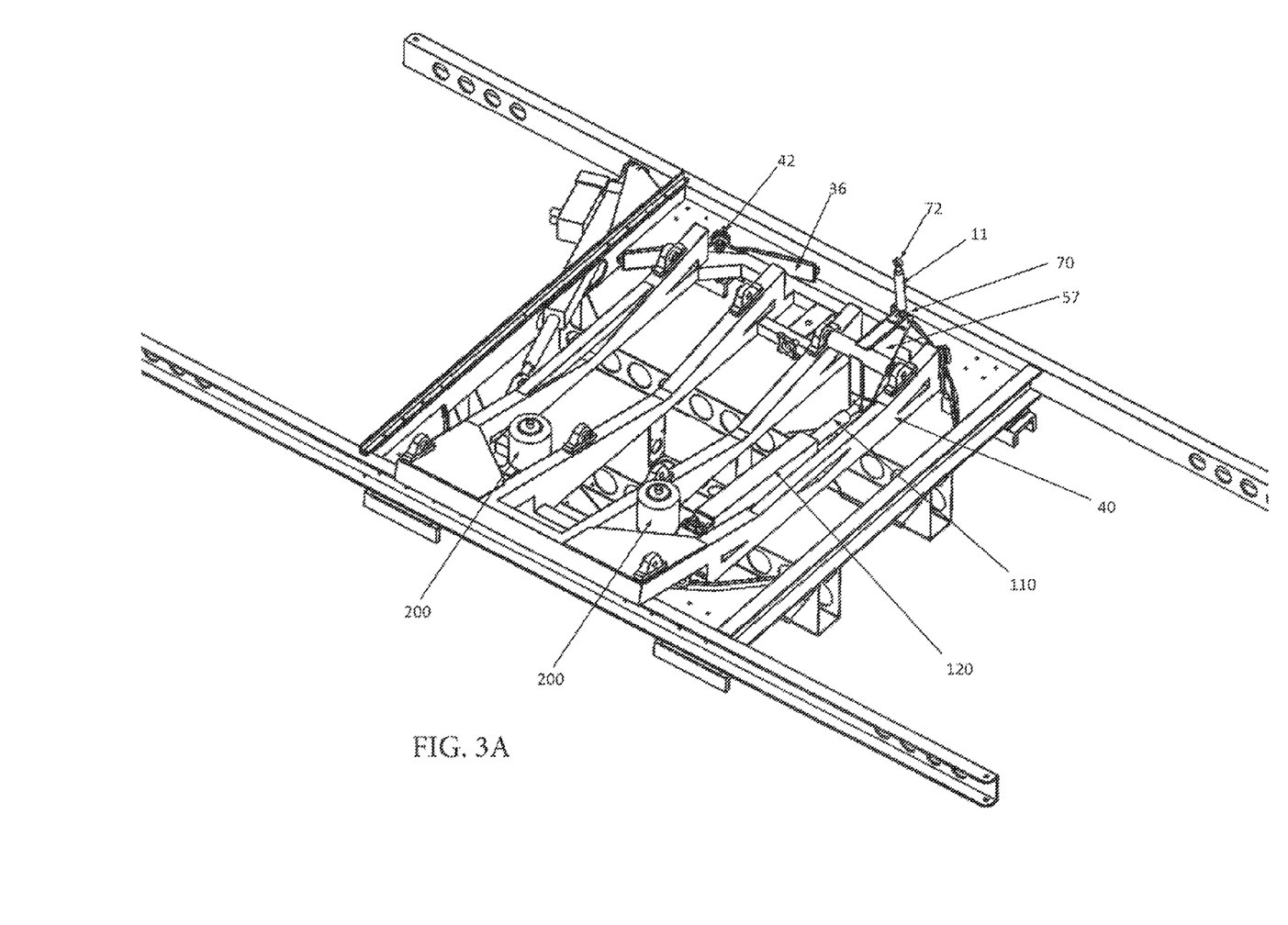
FIG. 3A shows the sway and yaw frames.

Raceway 36 is carried on the uppermost carriages. Generally these will be the carriages 24 of the first serial robot. Raceway 36 (FIG. 3) may simply be a planar surface but in preferred embodiments of the invention, the raceway is defined by a track, for example, of diamond or double vee cross section. In further reference to FIG. 3, rotary table 40 is provided and is rotationally mounted on the raceway 36. Preferably antifriction bearings 42 are provided between the raceway and the rotary table 40 although they are not essential if the abutting surfaces have a low coefficient of friction. Where provided, antifriction bearings could simply be balls received between the rotary table 40 and raceway 36. In other embodiments, antifriction bearings 42 could comprise wheels fixed relative to either the raceway or the rotary table. In the illustrated embodiment antifriction bearings 42 engage both upper and lower surfaces of the raceway. This allows the table to remain supported by its bearings irrespective of the movements it may be undergoing. Means for rotating the rotary table such as a linear actuator fixed relative to the rotary table are provided. Other means for rotation can be provided especially when more than about 40° of yaw is required. The rotary table therefore provides rotation parallel to notional axis B and hence provides yaw.

It will be apparent from the foregoing that each of the hereinbefore described stages are independent. Each stage can independently move in its degree of freedom without affecting the motion range or acceleration or velocity ability of any other of the aforementioned stages. This is in contrast with parallel stages.

Figure 4:
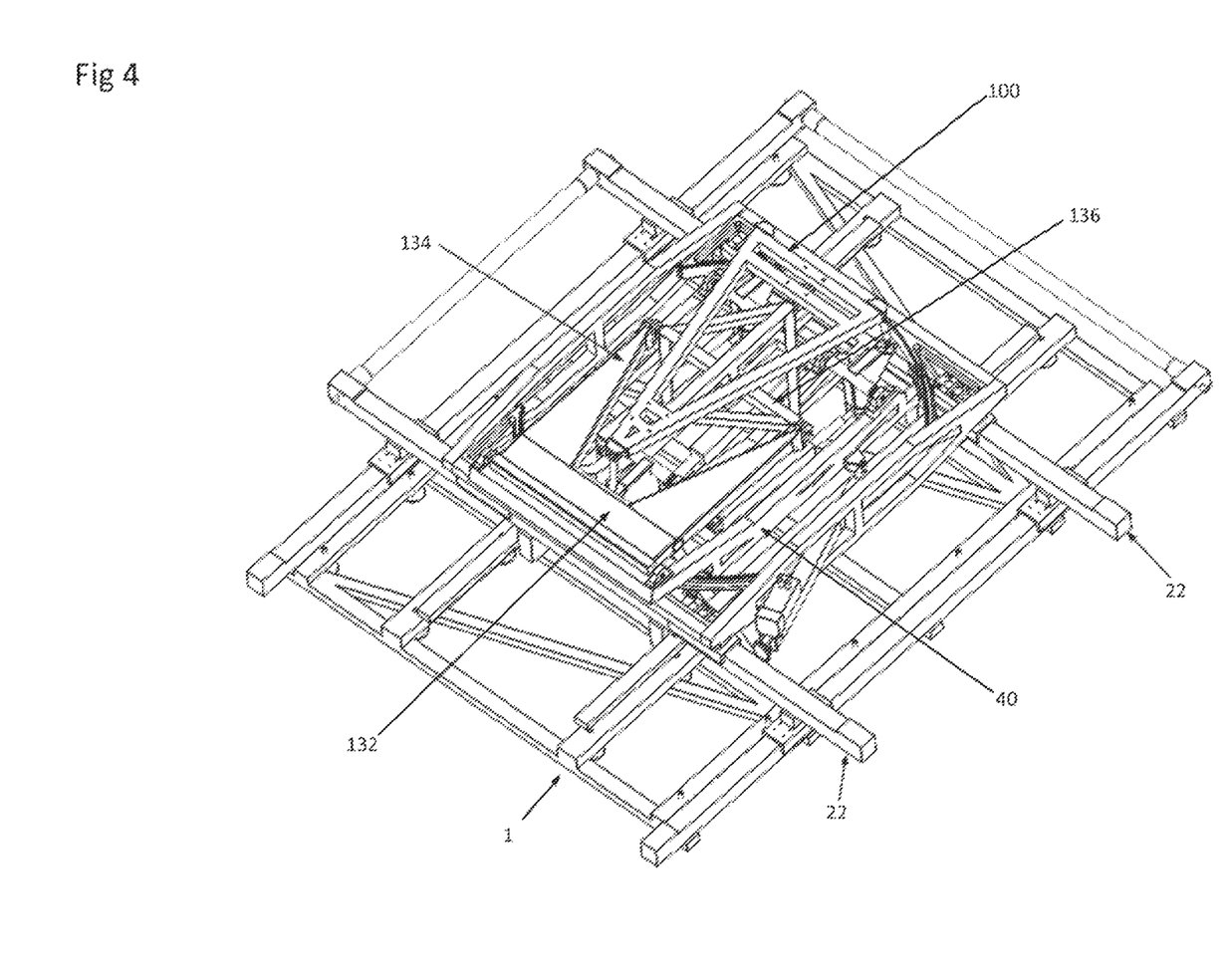
FIG. 4 is a perspective view of a motion platform of the invention.
Figure 6:
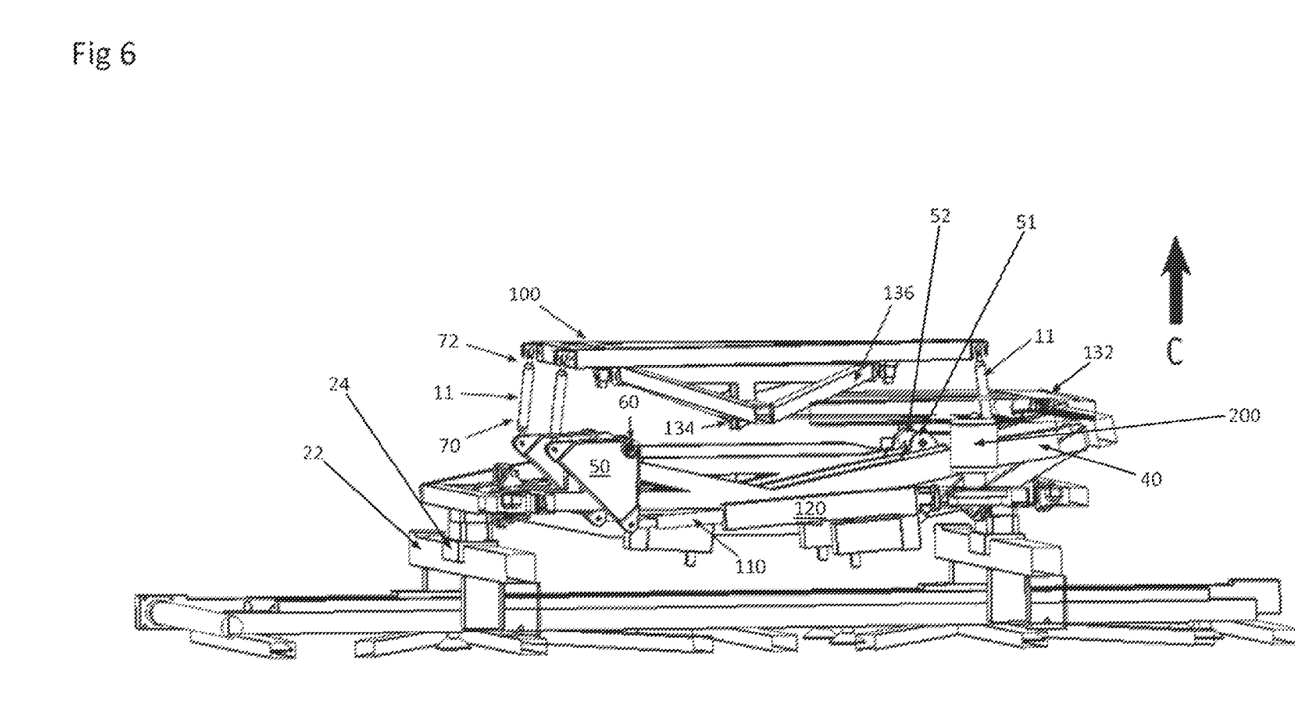
FIG. 6 is a further cross section of a motion platform of the invention.
Figure 6A:
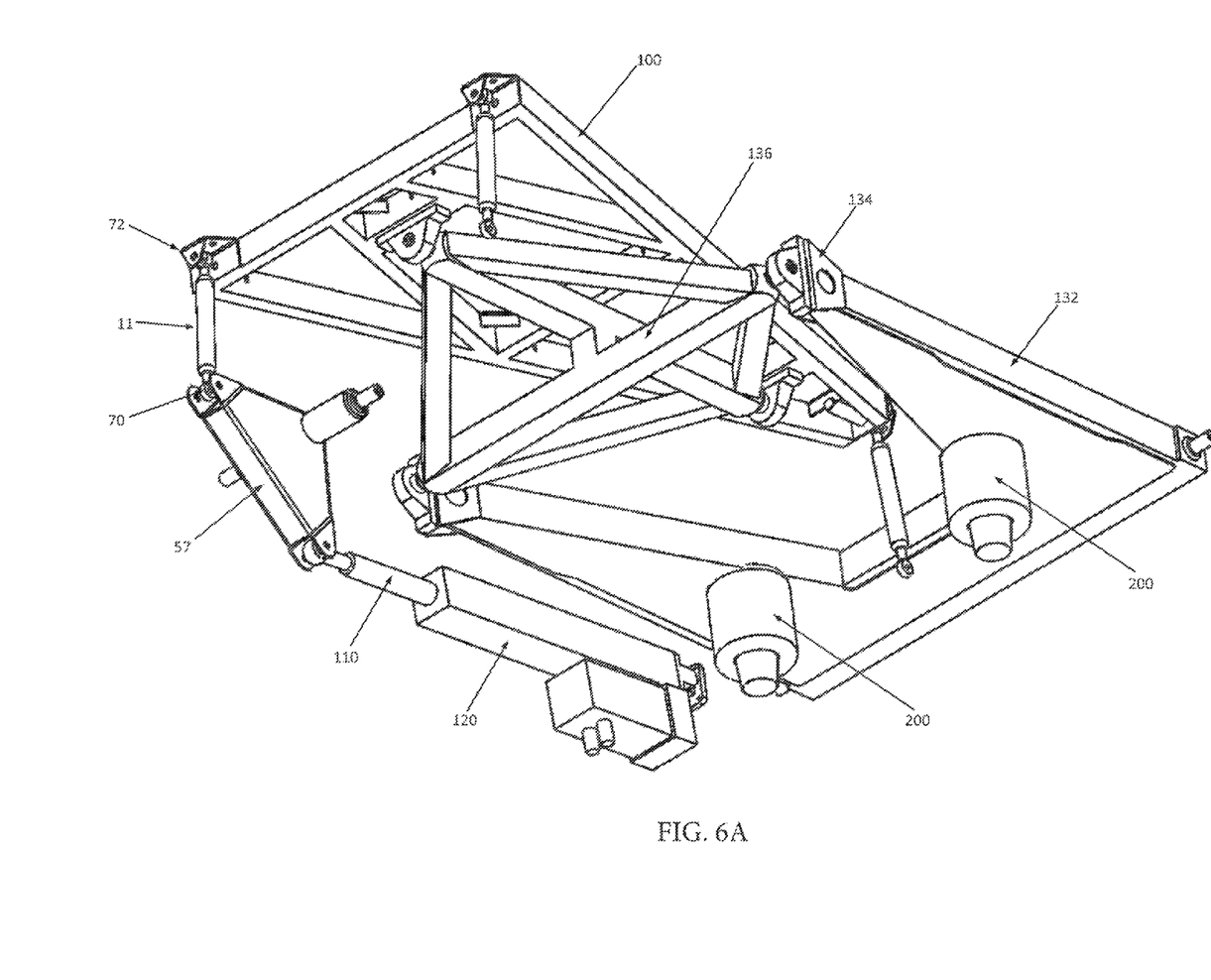
FIG. 6A is a view from below the support frame and spider.

With reference to FIGS. 4 and 6, table 40 is provided with first pivot 50, second pivot 51 and third pivot 52. In the illustrated embodiment the pivots are substantially horizontal. In the illustrated embodiment, first and second pivots 50, 51 are substantially coaxial along axis C. In the illustrated embodiment, third pivot 52 is spaced apart from the axis of the first and second pivots but is on an axis parallel to the axis of the first and second pivots. Those skilled will have no difficulty in devising other arrangements. In the illustrated embodiment, the pivots of the rotary table comprise plummer blocks. A bell crank 56, 57, 58 (FIG. 6) is mounted on each pivot 50, 51, 52. As illustrated in FIG. 4, trunnions 60 of the bell cranks are received in the plummer blocks. Those skilled in the art will be able to devise other arrangements for mounting the bell cranks. First ends 70 of legs 11 are pivotally mounted via a spherical joint on a first arm of each bell crank. Second ends 72 of legs 11 are pivotally mounted via a spherical joint to platform 100. The other arm of each bell crank is connected for example by pushrods 110 to linear actuators 120 mounted substantially horizontally on the rotary table. By operating these linear actuators such that each leg extends or retracts by the same amount, heave is achieved. By moving the leg of the third pivot relative to the first and second pivots, pitching can be achieved. By moving the leg of the first and second pivots in opposing directions, roll can be achieved. A combination of pitch, roll and heave can be achieved by appropriate actuation of the bell cranks. Since the bell cranks convert the horizontal motion to vertical motion the linear actuators can be positioned generally horizontally allowing the apparatus to be physically lower in overall height than if they were vertical. Since heave, pitch and roll are provided by a parallel machine maximum heave extension may for example limit the available degree of pitch available. Since sway, surge and yaw are independent from pitch heave and roll maximum surge extension for example would not prevent maximum pitch extension. Thus for example a user could experience suspension dive at maximum braking effort.

Using linear actuators and bell cranks when arranged appropriately as in the illustrated embodiment has the advantage of providing a nearly constant ratio of movement in line with the actuator to vertical movement at the end 72 of leg 11 over the motion range required. This results in a nearly constant mechanical advantage throughout the operating range which makes controlling motions easier and more efficient when compared with some other mechanisms such as a lever mounted on the output shaft of a gearmotor, the end of which is connected via a spherical joint to a vertical leg such as leg 11 in the illustrated embodiment.

Figure 5:
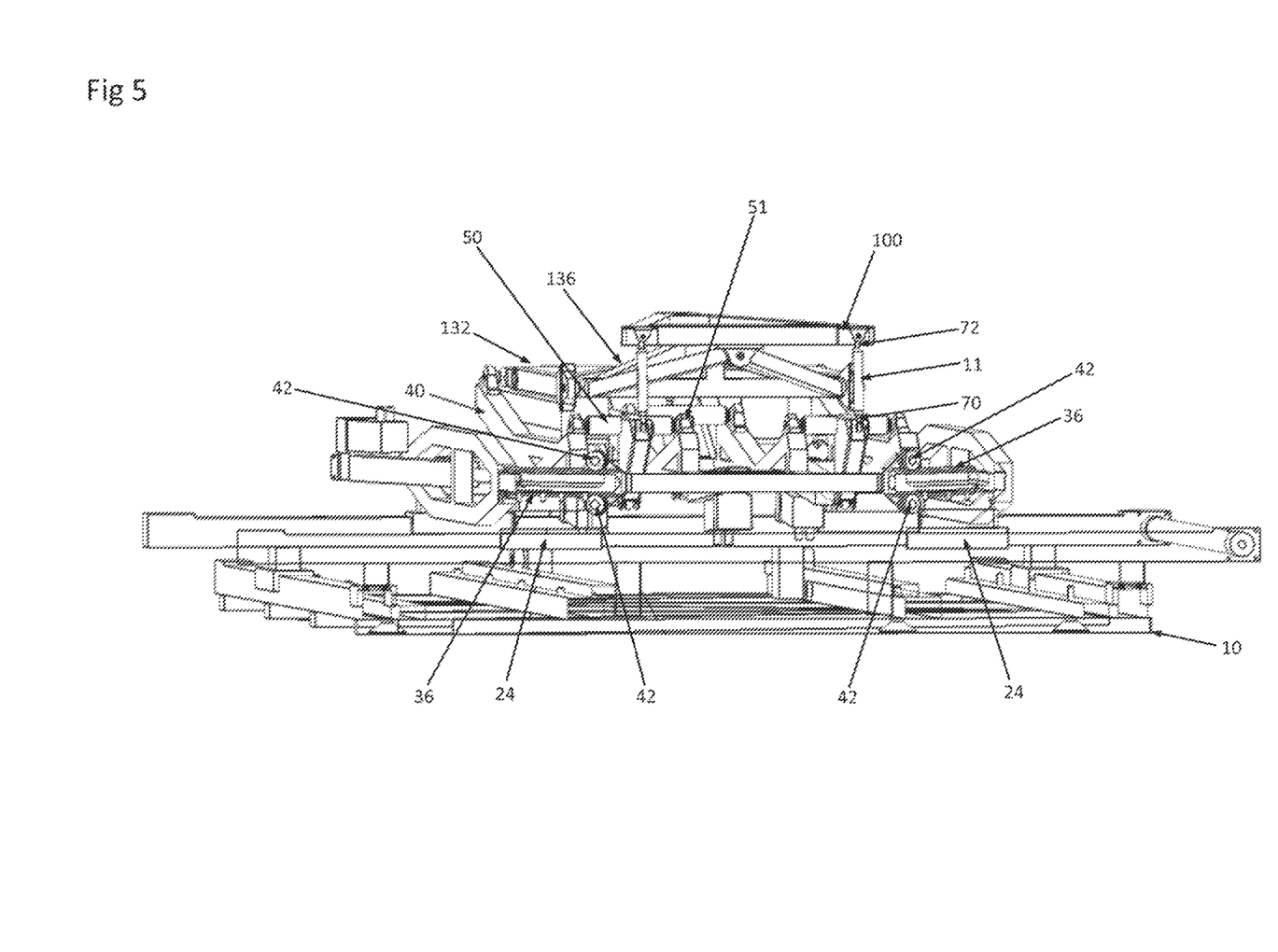
FIG. 5 is a cross section of a motion platform of the invention.

Payload 130 (FIG. 5) is mounted on platform 100. Generally payload 130 will be positioned with its axis perpendicular to axis C. Payload 130 comprises a representation of the vehicle being simulated. For example for an automobile driving simulator, it may comprise a seat, steering wheel, throttle and brake. Other features such as gear shifts and instrument panels may be provided, as may representations of bodywork.

In some embodiments of the invention a support frame 132 is pivotally mounted on rotary table 40. The support frame has at least one arm extending from the pivot point. The arm terminates in free end or distal end 134 which is provided with a further pivot point. In preferred embodiments the angle defined by the plane of the first linear slideway and a line passing through the pivot mounting the first support frame to the rotary table and the further pivot point is less than 45 degrees for example less than 30 degrees such as 20 degrees or less. Free end 134 of support frame 132 is provided with pivots on which spider 136 is pivotally mounted. Spider 136 engages platform 100. The combination of support frame 132 and spider 136 has two crossed pivoting axes and thus provides simple and stiff locations in the surge and sway axes and in yaw leaving heave roll and pitch free. Pivoting of the support frame results in a small movement of the payload in either or both of surge and sway depending on the orientation of the rotary table. This may be ignored or compensated for by the first and/or second robots. Because the support frame 132 is mounted spaced apart from the rotary axis with an arm extending towards the rotary axis a compact arrangement is achieved. By providing support frame with a pivot or pivots spaced laterally from the platform the spider and platform the spider can nest into the support frame making the arrangement yet more compact. While the support frame has been shown with two pairs of pivots in principle either or both ends could be provided with fewer pivots or with more.

A resilient bias 200 (FIG. 6) urges the spider against the platform. This allows the weight of the payload to be at least partially carried by the resilient bias rather than the actuators of the platform. This allows them to be smaller and cheaper than would otherwise be the case. In preferred embodiments the resilient bias is an air-spring. This allows the degree of resilient bias to be altered for example to account for different payload weights. A further advantage of an air spring is that it can be arranged to operate over a displacement range with near zero rate and therefore the deflection obtained by a load is independent of how far the bias has been displaced. Other zero-rate springs can be used as can other springs such as compression springs, tension springs.

The simulator further comprises a visual display for displaying a representation of the simulated environment such as the road ahead. In a real environment, the driver will generally focus his eyes at infinity. In a simulator this is difficult to achieve. If the visual display is mounted on the payload, then the driver will experience unrealistic and unpleasant sensations if positioned close to the driver. If mounted on the payload a long distance from the driver's eyes, then the extra dynamic load reduces the system performance. In another solution the visual display is fixed relative to the ground but the representation needs to be varied to correct the point of view of the driver. Furthermore large displacements require the driver to refocus.

In accordance with some embodiments of the invention, the visual display 140 (FIG. 8) is fixed relative to on the first serial robot. For example visual display 140 may be carried by support members 142. The visual display will therefore move with the payload in sway (and in surge if the apparatus is appropriately fitted or configured) but not with heave, pitch or yaw. Sway and surge are generally the largest movements in an automobile simulation and since the driver will move with the visual display in sway and surge, no refocusing of the eyes is required. In some embodiments of the invention the visual display is arcuate. Preferably the arcuate display is centered on the axis of rotation and has a radius equal to the distance from which the display is spaced apart from the axis of rotation. In this case yaw of the payload also does not require refocusing. While in the illustrated embodiment the visual display is arcuate, other configurations such as elliptical sections can be used.

The visual representation may be projected onto the visual display, which could comprise a screen, for example by one or more projectors 144 carried on the rotary table. In this way the projectors are not subject to the small amplitude but high acceleration movements in heave, pitch and roll which may damage them. Furthermore it removes them the dynamic load of the heave, pitch and roll stage which would otherwise degrade performance.

The simulator of the invention comprises other components such as a real time dynamic software model of a vehicle, interfaces to measure driver inputs and to supply them to the dynamic model, a software model of an environment through which the driver commands the vehicle and optionally additional hardware-in-the loop subsystems interfaced with the model so that the behaviour of other components such as electronic engine controllers can be included in the system. Those skilled in the art will be able to devise suitable components such as those already known in the art.

While described by reference to automobile simulators the invention is not so limited and has applications in other simulations including fixed and rotary wing aircraft and boats.

The invention claimed is:

1. A motion platform for an automobile simulator comprising
   1) a first linear slideway carrying a first carriage;
   2) means for displacing said first carriage along said first slideway along a first axis to impart sway;
   3) a rotary table carried on said first carriage for rotation about a second axis perpendicular to said first axis;
   4) means for rotating said rotary table to provide yaw;
   5) three bell cranks each having first and second arms, said three bell cranks each being pivotally mounted on said rotary table such that actuation of said bell crank causes said second arm to move with a component perpendicular to said first and second axes;
   6) means for independently actuating said first arms of said three bell cranks;
   7) a platform, which is not the rotary table;
   8) legs connecting said second arms of said three bell cranks to said platform;
   9) a support frame pivotally mounted on said rotary table spaced apart from the second axis, said support frame having an arm extending from a pivot point toward the second axis and terminating in a distal end that is provided with a further pivot;
   10) means for abutting said platform, said abutting means being pivotally mounted in the further pivot of said support frame; and
   11) a resilient bias urging said abutting means against said platform.

2. The motion platform of claim 1 wherein an angle defined by a plane of said first linear slideway and a line passing through the pivot mounting said support frame to said rotary table and said pivot mounting said abutting means is 45° or less.

3. The motion platform of claim 2 wherein said angle is 30° or less.

4. The motion platform of claim 1 wherein said bell cranks comprise first and second bell cranks each having first and second arms, said first and second bell cranks being coaxially pivotally mounted on said rotary table, an axis of said coaxial pivotal mount of said first and second bell cranks being in a plane parallel to said plane of the first linear slideway; and
   a third bell crank having first and second arms, said third bell crank being pivotally mounted on said rotary table, an axis of the pivotal mount of said third bell crank being parallel to and spaced apart from said axis of said first and second bell cranks.

5. The motion platform of claim 1 wherein said first linear slideway is carried on a second carriage, said second carriage being mounted on a second linear slideway, said second linear slideway being arranged on an axis perpendicular to said first axis of said first linear slideway and perpendicular to said second axis of rotation of said rotary table.

6. The motion platform of claim 1 wherein said resilient bias comprises an adjustable air spring.

7. An automobile simulator comprising a motion platform, said motion platform comprising:
1) a first linear slideway carrying a first carriage;
2) means for displacing said first carriage along said first slideway along a first axis to impart sway;
3) a rotary table carried on said first carriage for rotation about a second axis perpendicular to said first axis;
4) means for rotating said rotary table to provide yaw;
5) three bell cranks each having first and second arms, said three bell cranks each being pivotally mounted on said rotary table such that actuation of said bell crank causes said second arm to move with a component perpendicular to said first and second axes;
6) means for independently actuating said first arms of said three bell cranks;
7) a platform, which is not the rotary table;
8) legs connecting said second arms of said three bell cranks to said platform;
9) a support frame pivotally mounted on said rotary table spaced apart from the second axis, said support frame having an arm extending from a pivot point toward the second axis and terminating in a distal end that is provided with a further pivot;
10) abutting means for abutting said platform, said abutting means being pivotally mounted in the further pivot of said support frame; and
11) a resilient bias urging said abutting means against said platform.

8. The simulator of claim 7 further comprising an arcuate visual display having a radius, the arcuate visual display being fixed relative to said first carriage and positioned with its radius away from said second axis of rotation of said rotary table.

9. The simulator of claim 7 further comprising means for projecting an image to a visual display, said means for projecting an image to said visual display being fixed relative to said rotary table.

10. The simulator of claim 8 further comprising means for projecting an image to said arcuate visual display, said means for projecting an image to said arcuate visual display being fixed relative to said rotary table.

* * * * *